United States Patent [19]

Cawley

[11] 4,188,219
[45] Feb. 12, 1980

[54] RUPTURABLE FLUID CONTAINER AND ELEMENTS CONTAINING SAME

[75] Inventor: John D. Cawley, Rochester, N.Y.

[73] Assignee: Eastman Kodak Company, Rochester, N.Y.

[21] Appl. No.: 959,827

[22] Filed: Nov. 13, 1978

[51] Int. Cl.² .................. G03C 1/48; G03C 5/54; B43M 3/00; B65D 35/14
[52] U.S. Cl. .................. 430/208; 156/442.2; 222/92; 222/107; 260/DIG. 37
[58] Field of Search .............. 96/76 C, 29 R, 95, 3; 156/441.5, 442.2; 260/DIG. 37, 29.1 R, 78.5, 890, 899; 428/343, 346, 355; 222/92, 93, 95, 107

[56] References Cited

U.S. PATENT DOCUMENTS

| | | | |
|---|---|---|---|
| 3,243,416 | 3/1966 | Caldwell et al. | 260/85.5 |
| 3,485,775 | 12/1969 | Cenci et al. | 260/899 |
| 3,536,788 | 11/1970 | Hurwitz et al. | 260/890 |
| 3,649,282 | 3/1972 | Campbell | 96/76 C |
| 3,652,476 | 3/1972 | Fellers et al. | 260/29.1 |
| 3,705,136 | 12/1972 | Cawley et al. | 260/899 |
| 3,716,524 | 2/1973 | Cenci | |
| 3,784,532 | 1/1974 | Fellmann et al. | 260/899 |
| 3,916,051 | 10/1975 | Wakeman | 428/343 |
| 3,986,640 | 10/1976 | Redmond | 222/92 |
| 3,986,640 | 10/1976 | Redmond | 222/92 |
| 4,054,232 | 10/1977 | Cawley | 96/76 C |
| 4,054,233 | 10/1977 | Cawley | 260/78.5 |

FOREIGN PATENT DOCUMENTS

1045289  11/1958  Fed. Rep. of Germany ........... 260/890

OTHER PUBLICATIONS

Research Disclosure #12713, Nov. 1974–Anonymous, Pods for Photographic Solutions.

Primary Examiner—J. Travis Brown
Assistant Examiner—Louis V. Falasco
Attorney, Agent, or Firm—J. Lanny Tucker

[57] ABSTRACT

Disclosed herein are containers useful for holding fluids, e.g. photographic processing materials, in photographic film units. Such containers have strong seals along certain marginal areas and relatively weak seals along other marginal areas. Such weak seals are designed to open and distribute fluid over a sheet of film or paper when pressure is applied to the container in a camera. Each weak seal is formed from a sealing composition comprising a copolymer of (a) at least about 50 percent, by weight, of a polymerizable monomer having the formula (I):

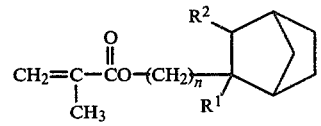

wherein n is an integer of from 0 to 3; $R^1$ is hydrogen or alkyl; and $R^2$ is hydrogen, alkyl or phenyl; with (b) a copolymerizable monomer having the formula (II):

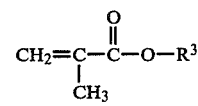

wherein $R^3$ is alkyl. This copolymer has a glass transition temperature of at least about 80° C.

22 Claims, 5 Drawing Figures

RUPTURABLE FLUID CONTAINER AND ELEMENTS CONTAINING SAME

BACKGROUND OF THE INVENTION

1. Field of the Invention

This invention relates to fluid containers which exhibit increased resistance to premature burst caused by mechanical shock. In particular, this invention relates to containers for holding fluid photographic processing materials for in-camera developing. These containers comprise a polymeric sealing composition along certain of their marginal areas. This invention also relates to photographic film units having improved fluid containers.

2. Description of the Prior Art

Polymers useful in a sealing composition for forming preferentially bursting seals in containers for photographic materials are known. Such a sealing composition is generally located along a marginal area of a container which is intended to burst and release a fluid, such as a photographic processing fluid, when pressure is applied to the container in a camera. The sealing composition is generally coated over an inner layer of the container which is resistant to chemical action by the contained fluid. In the case of photographic processing fluids, the inner layer of the container is resistant to alkaline conditions.

Many burst sealing compositions known in the art are mixtures of polymers. However, such mixtures typically form heterogeneous layers when coated. The resulting seals from such heterogeneous layers exhibit low adhesive strength over a wide range of sealing temperatures and are susceptible to fluid leakage. As a result, the seals tend to burst prematurely when subjected to mechanical shock from fabrication, shipping, handling and the like.

Some polymers have been used alone as sealing compositions. U.S. Pat. No. 4,054,233 issued Oct. 18, 1977 to Cawley discloses crosslinkable homopolymers which act as adhesives when crosslinked. Copolymers of 2-acetoacetoxyethyl methacrylate and 2-norbornylmethyl methacrylate are disclosed in U.S. Pat. No. 4,054,232 issued Oct. 18, 1977 to Cawley. The polymers disclosed in this patent also act as adhesives only when crosslinked. However, these crosslinkable materials tend to crosslink prematurely and are considerably more costly than noncrosslinkable adhesives. Non-crosslinkable sealing compositions are disclosed in *Research Disclosure*, Vol. 127, November, 1974, publication 12713, published by Industrial Opportunities, Ltd., Homewell, Havant Hampshire P09 1EF, United Kingdom. Among these sealing compositions is poly(2-norbornylmethyl methacrylate). A method of making this polymer and related copolymers and their use in non-photographic products are disclosed in U.S. Pat. No. 3,243,416 issued Mar. 29, 1966 to Caldwell et al.

Unfortunately, fluid containers sealed with poly(2-norbornylmethyl methacrylate) sometimes rupture when subjected to mechanical shock during fabrication, handling and shipping. The tendency to rupture appears to increase with age, that is, after storage for some time. Further, poly(2-norbornylmethyl methacrylate) lacks desired burst sealing strength over a wide range of sealing temperatures.

Hence, it is desirable to have a fluid container which is resistant to bursting or failure when subjected to mechanical shock. It is also desirable to have sealing compositions for these containers which exhibit desired burst sealing strength over a wide sealing temperature range, such as 125° to 250° C. It is also desirable for such compositions to retain this strength over a long period of time. Furthermore, these compositions should be non-crosslinkable so as to avoid the problems of premature crosslinking and higher production costs.

SUMMARY OF THE INVENTION

This invention provides improved sealing compositions comprising certain non-crosslinkable copolymers. These copolymers can be used to form improved preferentially bursting seals in containers which are useful for holding fluids, such as photographic processing materials. The seals formed by these copolymers exhibit desired burst sealing strength over a wide range of sealing temperatures. They show excellent resistance to bursting or failure from mechanical shock and to changes in strength as they age in storage.

In one aspect of the present invention, there is provided an improved container useful for holding a fluid, such as a photographic processing material. Such a container typically comprises a pair of opposed walls marginally sealed together over a substantial area to provide an internal cavity adapted to retain a fluid. At least one of these walls is flexible and deformable. The opposed walls are marginally sealed together over a first part of the aforementioned area and a polymeric sealing composition is interposed between these opposed walls over a second part of the area to form a seal of less strength than over the first part of the area. This seal of less strength causes the container to preferentially burst along the second part of the area upon the application of pressure to the container. In practicing this invention, the polymeric sealing composition that forms the relatively weaker seal comprises a copolymer of (a) at least about 50 percent by weight of a polymerizable monomer having the formula (I):

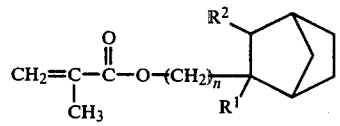

wherein n is an integer of from 0 to 3; $R^1$ is hydrogen or alkyl; and $R^2$ is hydrogen, alkyl or phenyl; with (b) a copolymerizable monomer having the formula (II):

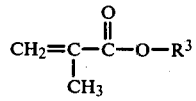

wherein $R^3$ is alkyl. Suitable copolymers have a glass transition temperature of at least about 80° C.

Another aspect of the present invention provides a photograhic film unit comprising a support and the improved container described herein.

DESCRIPTION OF THE PREFERRED EMBODIMENTS

Figure 1:
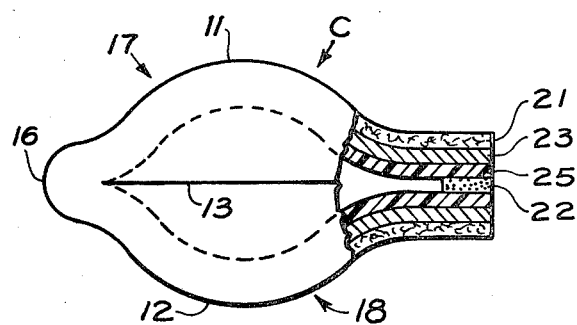
FIG. 1 is a side elevational view, partly broken away and shown in section, of a container in accordance with this invention.
Figure 2:
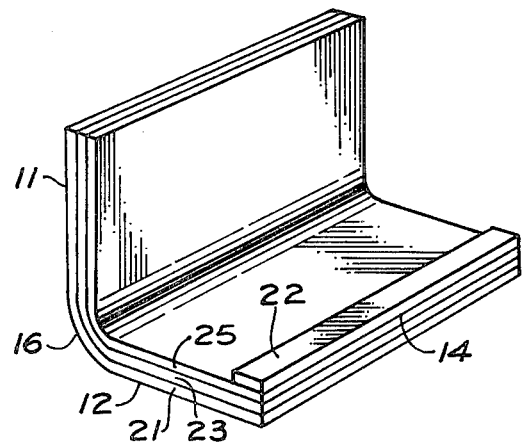
FIG. 2 is a perspective view of a blank which can be folded to form the container of FIG. 1.

As previously indicated herein, the sealing composition useful in this invention comprises a specific class of copolymers having properties which make them particularly suitable for forming preferentially bursting seals. These copolymers are formed from (a) at least about 50 percent by weight of a polymerizable monomer having the formula (I):

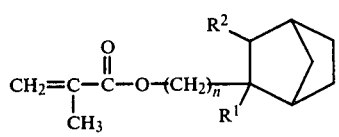

wherein n is an integer of from 0 to 3, preferably 1; $R^1$ is hydrogen or alkyl, such as methyl, ethyl, isopropyl, butyl, t-butyl, and the like, and preferably hydrogen or alkyl of 1 to 4 carbon atoms, and is more preferably hydrogen; and $R^2$ is hydrogen, alkyl, preferably of 1 to 6 carbon atoms, such as methyl, ethyl, propyl, 2-methylbutyl and the like, or phenyl, and is more preferably hydrogen; with (b) a copolymerizable monomer having the formula (II):

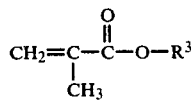

wherein $R^3$ is alkyl, preferably of 1 to 14 carbon atoms, such as methyl, ethyl, propyl, isopropyl, octyl, decyl, lauryl and the like, more preferably of 1 to 12 carbon atoms and most preferably of 1 to 5 carbon atoms.

Exemplary monomers within the scope of formula (I) are 2-norbornyl methacrylate, 2-norbornylmethyl methacrylate, 2-norbornylethyl methacrylate, 2-norbornylpropyl methacrylate, 3-methyl-2-norbornylmethyl methacrylate, 2-methyl-2-norbornylethyl methacrylate, 3-phenyl-2-norbornylmethyl methacrylate and the like. A preferred monomer is 2-norbornylmethyl methacrylate.

Monomers having formula (I) can be prepared by any suitable method known in the art. One such method is disclosed in U.S. Pat. No. 3,243,416 issued Mar. 29, 1966 to Caldwell et al. In general, the technique disclosed in that patent comprises refluxing the appropriate 2-norbornylalkanol with methacrylic acid in a suitable solvent in the presence of a polymerization inhibitor and an acidic catalyst. A suitable solvent is benzene. A useful polymerization inhibitor is hydroquinone. A typical acidic catalyst is sulfuric acid.

Exemplary copolymerizable monomers within the scope of formula (II) are methyl methacrylate, ethyl methacrylate, n-propyl methacrylate, isopropyl methacrylate, n-butyl methacrylate, sec-butyl methacrylate, hexyl methacrylate, decyl methacrylate, lauryl methacrylate and the like. Preferred monomers include methyl methacrylate, n-butyl methacrylate, and lauryl methacrylate.

The copolymers used in practicing this invention contain at least about 50 percent, by weight, of polymerized monomer of formula (I). The use of at least 50 percent, by weight, of such monomer provides a copolymer having a glass transition temperature of at least 80° C. Copolymers used in this invention preferably contain from about 60 to about 90 percent and most preferably, from about 65 to 80 percent, by weight, of polymerized monomer of formula (I). Preferred copolymers are those prepared from the previously indicated preferred monomers.

Each copolymer described herein typically has an inherent viscosity in the range of from about 0.1 to about 1.5, and preferably from about 0.3 to about 0.9, measured at 25° C. in toluene, tetrahydrofuran or benzene at a concentration of 0.25 gram copolymer per deciliter of solution. Each copolymer generally has a glass transition temperature of at least about 80° C., preferably in the range of from about 80° to about 150° C., and more preferably in the range of from about 80° C. to about 110° C. Glass transition temperature (Tg), as used herein, can be determined by any suitable method, including differential scanning colorimetry, as disclosed in "Techniques and Methods of Polymers Evaluation," Vol. 2, Marcel Dekker, Inc., N.Y., 1970.

In addition, each copolymer described herein generally exhibits a peel strength in the range of from about 50 to about 250 g/cm, preferably in the range of from about 95 to about 240 g/cm, and more preferably in the range of from about 140 to about 220 g/cm, at 180 degrees and a peel rate of 2.54 cm/min. The details of determining peel strength are illustrated below in the examples. Generally, peel strength is the force required to separate two adhesively sealed surfaces typically from 1 to 5 cm wide and from 25 to 35 cm long at a specified separation angle, e.g. 180 degrees, and rate, e.g. 2.54 cm/min.

The polymerization conditions which can be used for making the copolymers described herein are those commonly employed in polymerization techniques known in the art, including emulsion, suspension, and solution polymerization techniques and preferably solution polymerization techniques. Polymerization temperature is subject to wide variation as it depends upon several variables, but it is generally in the range of from about 20° to about 120° C. The pressure employed in the polymerization, if any, is usually only sufficient to maintain the reaction mixture in liquid form. The polymerization can be carried out in any suitable vehicle, for example, in water or mixtures of water with water miscible solvents, such as methanol, ethanol, propanol, isopropyl alcohol, butyl alcohol, and the like for emulsion and suspension polymerization, or in an organic solvent alone or in mixtures of organic solvents such as N,N-dimethyl formamide, dimethyl sulfoxide, dioxane, benzene, and the like for solution polymerization. The concentration of polymerizable monomer in the polymerization solution, suspension, or emulsion can be varied widely with concentrations up to about 50%, by volume, and preferably in the range from about 20% to about 50%, by volume, being satisfactory. Suitable catalysts include free radical catalysts, such as hydrogen peroxide, cumene hydroperoxide, benzoyl peroxide, and azo type initiators, and the like. In redox polymerization systems, the usual ingredients can be employed. If desired, the copolymer can be isolated from the reaction medium by freezing, salting out, precipitation, or any other procedure suitable for this purpose.

Specific conditions for making these copolymers are illustrated below in Preparations 1–5.

The sealing compositions useful in this invention can be conveniently prepared by dissolving the copolymers described herein in a suitable solvent, such as dichloromethane, toluene, tetrachloroethane, n-propyl acetate, and the like. Generally, the concentration of copolymer in the resulting solution is in the range of from about 54 to about 216 grams per liter of solvent.

The sealing composition can be coated by any appropriate method, e.g., it can be coated by hand or by machines using techniques known in the art. Typical coatings employ generally from about 0.8 to about 2.6 grams of dry composition per square meter of support.

The sealing compositions described herein can be used to form preferentially bursting seals in a wide variety of containers. These containers are also known as pods. Typical containers comprise a rectangular sheet of liquid and air-impervious material folded longitudinally upon itself to form two walls which are sealed to one another along their longitudinal and end margins to form a cavity in which a fluid, e.g., a photographic processing solution, is contained. Typical suitable containers are described, for example, in U.S. Pat. Nos. 2,543,181; 2,643,886; 2,653,732; 2,723,051; 3,056,492; 3,056,492; 3,056,491; 3,152,515; 3,649,282; and 4,054,233. The following description, in reference to drawings 1–3, illustrated features of containers that are preferred for use in this invention.

Figure 3:
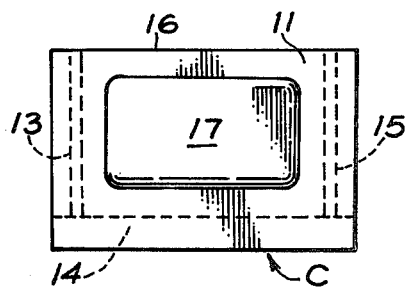
FIG. 3 is a plane view of the container of FIG. 1.

FIGS. 1 and 3 show a rectangular container C comprising an upper wall 11 and a lower wall 12, both of which are made of flexible material, which are sealed together along material areas 13, 14, and 15 extending around three sides of the container. The fourth side 16 is closed as a fold of the laminated sheet from which the container is formed. This side could also comprise two edges sealed together when forming the container from separate sheets. The internal areas of the container walls are not sealed together, but are spaced apart to form a storage space for a fluid material. This storage space is in the form of bubble-like protuberances 17 and 18 on each side of the container.

Referring to FIG. 1, the two flexible walls 11 and 12 are of laminated construction and include several layers which are adhesively joined to one another. Specifically, strong kraft paper layer 21 is adhered to metal foil layer 23 which is impervious to the passage of liquid and to the passage of air. The metal foil can be of lead of aluminum or any other metal suitable for this purpose. These paper-foil laminates are generally purchased in sheet form as they are commercially available.

The innermost layer 25 can be, but need not be, a material which is resistant to deterioration by the action of the contained fluid material. Exemplary materials are resins such as poly(vinyl chloride), and copolymers of vinyl chloride with from about 2 to about 15 percent, by weight, of vinyl acetate or vinyl alcohol, and the like; heavy papers and the like. Layer 25 can be applied to the metal foil by any convenient method, including solvent coating or by means of an adhesive composition. A final layer or seal 22 is the burst sealing composition described herein which is coated as a narrow strip along marginal area 14 of the container where a preferentially bursting seal is desired.

The two halves 11 and 12 of the container can be joined together along marginal areas 13, 14, and 15 by heat or pressure sealing. Where seal 22 along marginal area 14 contacts layer 25, a relatively weaker or preferentially bursting seal results, e.g., a seal having a peel strength in the range of from about 50 to about 250 g/cm. When the contained fluid is to be expelled through seal 22 on marginal area 14 by pressure, e.g. by passing a pair of rolls (not shown) over the container, pressure can be applied first at the back edge 16 and moved toward marginal area 14 to break seal 22 and expel the fluid. The purposes of this invention are achieved when the seals at marginal areas 13 and 15 are sufficiently stronger than seal 22 to resist bursting when pressure is applied.

Instead of coating only one strip of sealing composition along the edge of seal 22, both mating edge areas may be similarly coated so that the final seal 22 along that edge is by one strip to the other.

When container C is formed from separate sheets, side 16 need not be sealed for operability, although it should be sealed for storage purposes. When side 16 is formed by sealing two laminates together, the objectives of this invention can generally be achieved when the seal at marginal area 16 is stronger, weaker, or the same strength as seal 22. Such a seal on the back marginal area can be accomplished with the same coating composition applied on marginal area 14 for ease of manufacture. When seals 16 and 22 are made with the same sealing composition and are of equal strength, the container can be positioned with either edge forward for ease in assembly of film units or rolls of film.

Referring again to FIG. 1, even when back marginal area 16 of the container is inherently closed, it is desirable to pinch and heat seal the adjoining areas together so as to form a streamlined design, making it easy to pass a pair of compressing rollers or similar compressing devices across the container.

Instead of sealing the entire length of marginal area 14 under conditions to form a preferentially bursting seal, it is sometimes desirable to provide alternate areas of weak and strong sealing to assure uniform distribution of the contents of the container. For example, two areas coated with a burst sealing composition can be provided, spaced apart by a central or intermediate area of a stronger sealing composition. The container fluid can then be ejected in two separate streams which subsequently merge.

The containers of the present invention can be incorporated into photographic film units having a wide variety of formats, e.g., as disclosed in U.S. Pat. Nos. 2,543,181; 2,983,606; 3,362,819; 3,362,821; 3,415,644; 3,415,645; 3,415,646; 3,647,437; 3,635,707; 3,756,815; and 4,056,394 and Canadian Pat. Nos. 674,082 and 928,559.

A typical photographic film unit of the present invention can comprise:

A. a support having thereon a photosensitive silver halide layer, preferably having associated therewith a dye image-providing material;

B. an image-receiving layer;

C. a neutralizing layer for neutralizing an alkaline processing material; and

D. a container according to the present invention and having an alkaline processing material therein.

In addition, such film units can also contain other layers, including, e.g., timing layers, barrier layers, reflective layers, adhesion layers, spacer layers, cover sheets and the like. A more detailed discussion of these photographic products and the processes for using them is given in *Research Disclosure,* No. 151, November 1976, publication 15,162, pages 75-87, published by Industrial Opportunities Ltd., Homewell, Havant Hampshire, P09 1EF, United Kingdom. The photographic film units can be treated with an alkaline processing material to effect or begin development. This processing material can be applied from the container of this invention. In general, the processing material contains a developing agent, although the material can also be simply an alkaline solution when the developing agent is elsewhere in the element. In the latter case, the alkaline solution activates the incorporated developing agent.

Figure 4:
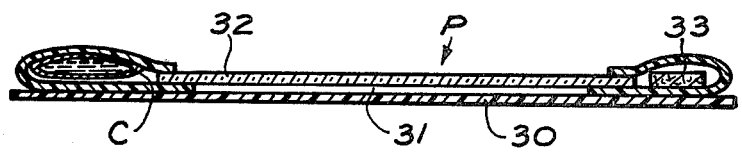
FIG. 4 is a longitudinal view, shown in section, of a photographic film unit in accordance with this invention.
Figure 5:
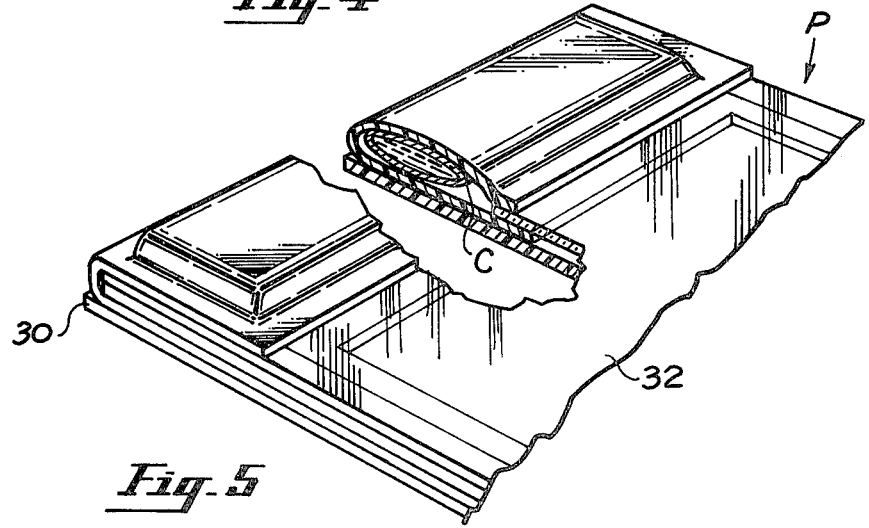
FIG. 5 is a cutaway perspective of a container in the photographic film unit of FIG. 4.

Referring to FIG. 4, photographic film unit P comprises an image-receiving layer 30. On top of that layer are a photosensitive layer 31 and a cover sheet 32. Container C is positioned at one end of film unit P. A trap spacer element 33 is positioned at the other end of film unit P. In FIG. 5, film unit P is partially cut-away to show container C in place across one end of the unit.

The invention is further illustrated by the following preparations and examples of its practice.

PREPARATIONS OF COPOLYMERS

Preparation 1: Poly(2-norbornylmethyl methacrylate-comethyl methacrylate) (weight ratio 75:25)

A sample of each of monomers methyl methacrylate and 2-norbornylmethyl methacrylate were purified by passing them through columns of sodium aluminum silicate. These samples were used to form a solution of methyl methacrylate (30 g), 2-norbornylmethyl methacrylate (90 g) and 2,2'-azobis(2-methylpropionitrile) catalyst (600 mg), in benzene (120 ml) and acetone (60 ml) solvents. This solution was then refluxed for 24 hours at 75° C. The resulting copolymer was precipitated with methanol, filtered, washed with methanol, and dried in vacuo at 55° C. The yield was 118 g of copolymer having an inherent viscosity of 0.31 (measured in benzene).

Preparation 2: Poly(2-norbornylmethyl methacrylate-coethyl methacrylate) (weight ratio 75:25)

A solution of 2-norbornylmethyl methacrylate (75 g) and ethyl methacrylate (25 g) monomers and 2,2'-azobis(2-methyl-propioitrile) catalyst (0.1 g) in dichloroethane (100 ml) solvent was heated at 60° C. for 48 hours under nitrogen. Additional dichloroethane (250 ml) was added to the resulting gel and the resulting mixture was stirred for 12 hours at 60° C. to produce a clear viscous solution. The resulting copolymer was precipitated in 8 liters of methanol, washed in methanol and dried in vacuo at 50° C. The yield was 100 g of copolymer having an inherent viscosity of 0.84 (measured in benzene) and a Tg of 104° C.

Preparation 3: Poly(2-norbornylmethyl methacrylate-coethyl methacrylate) (weight ratio 75:25)

This copolymer was prepared by the procedure described in Preparation 2 except that the solvent used was toluene and the reaction temperature was 70° C. The resulting copolymer had an inherent viscosity of 0.79 (measured in benzene) and a Tg of 101° C.

Preparation 4: Poly(2-norbornylmethyl methacrylate-colauryl methacrylate) (weight ratio 85:15)

A solution of 2-norbornylmethyl methacrylate (42.5 g) and lauryl methacrylate (7.5 g) monomers, 2,2'-azobis(2-methyl-propionitrile) (0.125 g) catalyst in toluene (50 ml) solvent was heated at 60° C. for 75 hours. The resulting copolymer was precipitated with methanol and dried in vacuo at 50° C. The yield was 49.2 g of copolymer having an inherent viscosity of 0.14 (measured in tetrahydrofuran) and a Tg of 84° C.

Preparation 5: Poly(2-norbornylmethyl methacrylate-co-n-butyl methacrylate) (weight ratio 65:35)

A solution of 2-norbornylmethyl methacrylate (1000 g) and n-butyl methacrylate (539 g) and 2,2'-azobis(2-methyl-propionitrile) catalyst (3 g) in toluene (1500 ml) solvent was heated at 60° C. for 48 hours. The resulting clear viscous solution was diluted with acetone (1500 ml) and cooled. The resulting copolymer was precipitated in methanol (40 liters), washed with methanol (20 liters), centrifuged and dried in vacuo at 60° C. The yield was 1440 g of copolymer having an inherent viscosity of 0.53 (measured in toluene) and a Tg of 81° C.

BONDING STRENGTH COMPARISONS

The following examples compare the bonding strengths, as illustrated by peel strength tests, of burst sealing compositions useful in this invention with polymeric sealing compositions outside the scope of this invention.

The bonding strengths of the various sealing compositions were evaluated using the equipment and procedure described as follows.

EQUIPMENT

The peel equipment consisted of a standard Instron tensile testing machine which has two parallel sets of mechanical jaws, one set being stationary, the other set being movable and mounted on a shaft. This machine has the capability of measuring and indicating the force required to separate adhered layers.

SEALANT COATINGS

A sample (8.6 g) of each polymeric sealing composition was dissolved in dichloroethane (92 g). The resulting solution was coated on a poly(vinyl chloride) surface of an 11.5 cm wide strip of laminate comprising kraft paper, lead foil, and poly(vinyl chloride) in that order. The coatings were about 12.5 microns thick after drying. The coated laminates were then cut into strips 2.54 cm wide and 30.5 cm long.

TEST PROCEDURE

Two laminate strips were sealed sealant-to-sealant to form a test strip with a Sentinel model sealer available commercially from Packaging Industries, Inc. of Hyannis, Mass., U.S.A., at each of the six temperatures listed in Table I. For each test strip, one end of one laminate strip was placed in the stationary set of jaws on the Instron tensile testing machine, while the same end of the other laminate strip was placed in the movable set of jaws. The laminate strips were then peeled at 180° at a rate of 2.54 cm/min. The force required to separate the laminate strips is expressed in grams per centimeter. The results recorded in Table I are the average of several replications at each temperature with each sealing composition. The peeled laminate strips were examined. Two types of failure were observed for some test strips: (1) adhesive, meaning all of the coating adhered to one of the strips and (2) delamination, meaning that separation occurred between two layers of the laminate.

The materials used in the controls and examples set forth in Tables I and II are identified in the portions of the specification immediately following the appropriate table.

Table I

| Run | Peel Strength (g/cm) at Various Sealing Temperatures | | | | | |
|---|---|---|---|---|---|---|
| | 135° C. | 149° C. | 177° C. | 191° C. | 207° C. | 232° C. |
| Control A | 207 | 335* | 305 | 330* | 355 | 340 |
| Control B | 70 | 175 | 235 | 365 | 355 | 355 |
| Control C | 35 | 45 | 53 | 100 | 95 | 89 |
| Control D | — | — | — | 83 | 85 | 75 |
| Control E | 26 | 35 | 45 | 75 | 77 | 77 |
| Control F | 77 | 81 | 81 | 110 | 108 | 110 |
| Example 1 | 116 | 134 | 157 | 183 | 185 | 179 |
| Example 2 | 126 | 132 | 179 | 179 | 203 | 200 |
| Example 3 | 95 | 112 | 140 | 151 | 200 | 197 |
| Control G | 29 | 69 | 114 | 315 | 163 | 200 |
| Control H | 163 | 187 | 214 | 251 | 222 | 222 |
| Control I | 2 | 4 | 6 | 49 | 47 | " |
| Example 4 | 114 | 95 | 108 | 199 | 220 | 197 |
| Control J | 98 | 177 | 248 | 385 | 383 | 366* |
| Example 5 | 179 | 208 | 208 | 342* | — | — |
| Example 6 | 118 | 155 | 179 | 134* | — | — |
| Control K | 18 | 18 | 28 | 37 | 39 | 41 |
| Control L | 10 | 12 | 14 | 51 | 47 | 53 |
| Control C | 35 | 45 | 53 | 100 | 95 | 89 |
| Example 7 | 77 | 87 | 95 | 128 | 173** | 163** |
| Example 8 | 130 | 134 | 130 | 143 | 151 | 142 |

*delamination
**adhesive failure
—not available

Materials

Control B: poly(ethyl methacrylate)
Control C: poly(2-norbornylmethyl methacrylate)
Control D: poly(2-norbornylmethyl methacrylate)
Control E: poly(2-norbornylmethyl methacrylate)
Control F: 75:25 (weight ratio) mixture of poly(2-norbornylmethyl methacrylate) and poly(ethyl methacrylate)
Control G: poly(methyl methacrylate)
Control H: poly(methyl methacrylate)
Control I: 75:25 (weight ratio) mixture of poly(2-norbornylmethyl methacrylate) and poly(methyl methacrylate)
Control J: 50:50 (weight ratio) mixture of poly(2-norbornylmethyl methacrylate) and poly(ethyl methacrylate)
Control K: poly(styrene)
Control L: poly(2-norbornylmethyl methacrylate-co-styrene), (40:60 weight ratio)
Example 1: poly(2-norbornylmethyl methacrylate-co-ethyl methacrylate), (75:25 weight ratio)
Example 2: poly(2-norbornylmethyl methacrylate-co-ethyl methacrylate), (75:25 weight ratio)
Example 3: poly(2-norbornylmethyl methacrylate-co-ethyl methacrylate), (75:25 weight ratio)
Example 4: poly(2-norbornylmethyl methacrylate-co-methyl methacrylate), (75:25 weight ratio)
Example 5: poly(2-norbornylmethyl methacrylate-co-ethyl methacrylate) (50:50 weight ratio)
Example 6: poly(2-norbornylmethyl methacrylate-co-methyl methacrylate) (50:50 weight ratio)
Example 7: poly(2-norbornylmethyl methacrylate-co-lauryl methacrylate) (85:15 weight ratio)
Example 8: poly(2-norbornylmethyl methacrylate-co-n-butyl methacrylate) (75:25 weight ratio)

Control A sets forth the results where no burst sealing composition is used, i.e., where the laminated substrate is sealed to itself by heat and pressure. Delamination occurred at two sealing temperatures. Undesirably high peel strengths resulted at sealing temperatures above 135° C. Delamination is particularly undesirable in containers used in photographic film units because the integrity of the container is destroyed and corrosive photographic processing material, e.g., alkaline developer fluid, is released within the unit prematurely.

In comparing Controls B–F to Examples 1–3, it is evident that the copolymer sealing compositions useful in this invention exhibit the required burst sealing strength over the wide sealing temperature range whereas the various homopolymers or mixtures of homopolymers have acceptable sealing strength over only part of the range. The peel strengths of Control B are too high at higher sealing temperatures. When the burst seal is too strong, it breaks unevenly under applied pressure, resulting in uneven distribution of the fluid. Controls C–F exhibited too little strength over the entire sealing temperature range. In contrast, Examples 1–3 exhibited preferred sealing strengths over the entire sealing temperature range. Preferred sealing strengths are in the range of from about 95 to about 240 g/cm.

Control G exhibited erratic peel strength which was either too low or too high at various temperatures. Control I exhibited low peel strength over the entire range. Example 4 showed desired lower peel strengths over all of the sealing temperature range.

Likewise, Control J exhibited too high peel strengths at higher temperatures. Examples 5 and 6 exhibited generally lower peel strengths than Control J.

Controls K and L indicate that styrene-containing polymers are not acceptable for use in the present invention. Their peel strengths are generally too low.

Control C is compared to Examples 7 and 8. It is clear that the copolymers of Examples 7 and 8 generally exhibited more desirable strength than the homopolymer of Control C. Some samples of the copolymer in Example 7 failed adhesively at high sealing temperatures.

These comparisons of peel strengths of various sealing compositions indicate that the compositions used in this invention have generally improved sealing strength over a wider range of sealing temperatures compared to prior art sealing compositions.

Resistance of Mechanical Shock

The following runs compare the resistance to mechanical shock exhibited by the containers of this invention with the resistance of a prior art container.

The resistance to mechanical shock was determined by a drop test. This test comprises laterally placing a 908 g weight on top of a container and repeatedly dropping a 75 g weight onto the 908 g weight from a height of 3 cm until the container bursts. The results of the runs are set forth in the following Table II. Control C and Examples 1, 4, 5 and 8 in this table are the same as in Table I. The containers were prepared with the sealing compositions at various sealing temperatures.

Table II

| | Average Number of Drops to Burst at Various Sealing Temperature | | | | | | | |
|---|---|---|---|---|---|---|---|---|
| | 163° C. | 177° C. | 191° C. | 205° C. | 219° C. | 233° C. | 246° C. | 260° C. |
| Control C | 1.4 | 1.4 | 1.7 | 2.0 | 2.2 | 2.5 | 2.5 | 2.9 |
| Example 1 | 2.0 | 2.7 | 3.0 | 3.8 | 4.1 | 4.5 | 5.0+ | 5.0+ |
| Example 4 | 6.5 | 4.2 | 7.8 | 4.9 | — | — | — | — |
| Example 5 | 2.5 | 2.4 | 3.3 | 5.7 | 7.5 | 10.+ | 10.+ | — |
| Example 8 | 3.5 | 4.8 | 5.2 | 6.1 | 7.0 | 7.8 | 7.4 | 15.+ |
| Example 9 | 4.7 | 5.2 | 6.5 | 6.9 | 8.5 | 9.5 | 11. | 12. |
| Example 10 | — | 3.0 | 11.0* | 3.0 | 10.4** | 18.3 | — | — |
| Example 11 | 7.8 | 4.1 | 4.9 | 8.5 | — | — | — | — |

*at 181° C.
**at 222° C.
—data not available

Example 9: poly(2-norbornylmethyl methacrylate-co-n-butyl methacrylate) (65:35 weight ratio)
Example 10: poly(2-norbornylmethyl methacrylate-co-ethyl methacrylate) (85:15 weight ratio)
Example 11: poly(2-norbornylmethyl methacrylate-co-methyl methacrylate) (90:10 weight ratio)

It can be seen that containers of this invention exhibit improved resistance to bursting or failure due to mechanical shock or impact over the entire sealing temperature range compared to control container C.

Aging Tests

This is an example of comparing the effect of aging or storage on bonding strengths of various sealing compositions as measured in a load test.

Load test values are in newtons and are determined by laterally placing a container in two parallel sets of mechanical jaws of an Instron Tensile testing machine. One set of jaws is fixed in position while the other set is mounted on an air driven shaft. A force of 0.9 newton per second is applied to the container until it bursts or until 110 newtons is reached. A load test value of at least about 43 newtons over a wide range of sealing temperatures is acceptable. Often the load test value will be in the range of from about 29 to about 98, and preferably in the range of from about 43 to about 57 newtons. Table III sets forth the results of load test runs carried out at 50% relative humidity. The sealing compositions used in the containers are those of Control C and Examples 1 and 5.

Table III

| Run | Sealing Temperature | Load Test Values (in newtons) | | | | | | | |
|---|---|---|---|---|---|---|---|---|---|
| | | Fresh | 7 days −18° C. | 7 days 25° C. | 7 days 49° C. | 7 days 63° C. | 30 days −18° C. | 30 days 25° C. | 30 days 49° C. |
| Control C | 163° C. | 27. | 25. | 25. | 23. | 29. | 25. | 27. | — |
| | 177° C. | 36. | 33. | 33. | 29. | 38. | 30. | 33. | 33. |
| | 191° C. | 39. | 41. | 40. | 36. | 32. | 36. | 38. | 36. |
| | 205° C. | 43.9 | 46.4 | 43.9 | 39. | 44.2 | 41. | 44.2 | 39. |
| | 219° C. | 52.0 | 55.8 | 55.0 | 45.1 | 45.1 | 46.4 | 47.7 | 43. |
| | 233° C. | 55.5 | 57.6 | 51.1 | 49.9 | 45.5 | 52.0 | 50.7 | 46.4 |
| | 246° C. | 59.0 | 63.6 | 56.4 | 54.6 | 49.4 | 55.4 | 62.8 | 50.4 |
| | 260° C. | 62.3 | 68.0 | 60.2 | 61.5 | 54.6 | 62.0 | 65.0 | 54.6 |
| Example 1 | 163° C. | 41. | 31. | 30. | 36. | 42. | 31. | 32. | 35. |
| | 177° C. | 55.5 | 52. | 44.7 | 46.4 | 45.1 | 46.8 | 47.7 | 42. |
| | 191° C. | 63.6 | 37. | 40. | 52.8 | 43. | 47.3 | 43.5 | 48.2 |
| | 205° C. | 73.5 | 74.4 | 63.2 | 70.8 | 48.6 | 63.2 | 69.0 | 58.4 |
| | 219° C. | 85.5 | 44.7 | 50.3 | 59.8 | 52.9 | 63.2 | 50.3 | 45.6 |
| | 233° C. | 96.4 | 85.5 | 80.0 | 85.2 | 64.9 | 50.7 | 81.3 | 70.0 |
| | 246° C. | 101. | 102. | 97.1 | 91.9 | 73.5 | 90.2 | 94.5 | 81.2 |
| | 260° C. | 108. | 68.8 | 68.8 | 89.0 | 86.4 | 61.5 | 60.2 | 82.1 |
| Example 5 | 163° C. | 84.2 | 104. | 103. | 100. | TU* | 93.2 | 102. | 92.5 |
| | 177° C. | 100. | TU | 108. | 104. | TU | 107. | 105. | 95.0 |
| | 191° C. | 100. | TU | 103. | TU | TU | 112. | TU | 107. |
| | 205° C. | TU | TU | TU | TU | TU | TU | TU | TU |
| | 219° C. | TU | TU | —** | TU | TU | TU | TU | TU |
| | 233° C. | TU | TU | — | TU | TU | TU | TU | TU |
| | 246° C. | TU | TU | — | TU | TU | TU | TU | TU |
| | 260° C. | TU | TU | — | TU | TU | TU | TU | TU |

*Time up for run and no breakage of burst seal in pod(TU)
**Data not available(—)

These results illustrate that the sealing compositions used in this invention provide improved retention of desired burst conditions.

Although this invention has been described in detail with particular reference to certain preferred embodiments thereof, it will be understood that variations and modifications can be effected within the spirit and scope of the invention.

I claim:
1. In a container useful for holding a fluid, said container comprising:
a pair of opposed walls marginally sealed together over a substantial area to provide an internal cavity adapted to retain said fluid, at least one of said walls being flexible and deformable, said opposed walls being marginally sealed together over a first part of said area, and a polymeric sealing composition interposed between said opposed walls over a second part of said area forming a seal of less strength than over said first part of said area, whereby said seal of less strength preferentially bursts along said second part of said area upon the application of pressure to said container, the improvement wherein:

said sealing composition comprises a copolymer of (a) at least about 50 percent, by weight, of a polymerizable monomer having the formula (I):

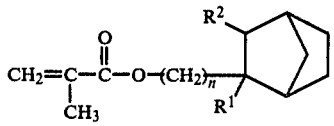

wherein n is an integer of from 0 to 3; $R^1$ is hydrogen or alkyl; and $R^2$ is hydrogen, alkyl or phenyl; with (b) a copolymerizable monomer having the formula (II):

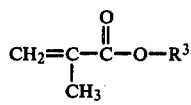

wherein $R^3$ is alkyl, said copolymer having a glass transition temperature of at least about 80° C.

2. The container of claim 1 wherein said copolymer of said sealing composition has an inherent viscosity in the range of from about 0.1 to about 1.5.

3. The container of claim 1 wherein said copolymer of said sealing composition has a peel strength in the range of from about 50 to about 250 g/cm, as measured at 180° and a rate of 2.54 cm/min.

4. The container of claim 1 wherein $R^1$ is hydrogen or alkyl of 1 to 4 carbon atoms; $R^2$ is hydrogen, alkyl of 1 to 6 carbon atoms or phenyl; and $R^3$ is alkyl of 1 to 14 carbon atoms.

5. The container of claim 1 wherein said copolymer of said sealing composition comprises from about 60 to about 90 percent, by weight, of (a) and has a glass transition temperature in the range of from about 80° to about 150° C.

6. The container of claim 1 in which said cavity contains a photographic processing material.

7. In a container useful for holding fluids, said container comprising:

a pair of opposed walls marginally sealed together over a substantial area to provide an internal cavity adapted to retain said fluid, at least one of said walls being flexible and deformable, the internal surfaces of said walls bounding said cavity comprising a polymer which resists deterioration by the action of said fluid, said opposed walls being marginally sealed together over a first part of said area, and a polymeric sealing composition interposed between said opposed walls over a second part of said area forming a seal of less strength than over said first part of said area, whereby said seal of less strength preferentially bursts along said second part of said area upon the application of pressure to said container, the improvement wherein:

said sealing composition comprises a copolymer of (a) at least about 50 percent, by weight, of a polymerizable monomer having the formula (I):

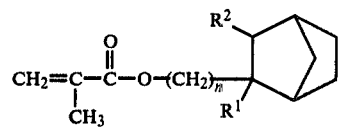

wherein n is an integer of from 0 to 3; and each of $R^1$ and $R^2$ is hydrogen; with (b) a copolymerizable monomer having the formula (II):

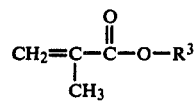

wherein $R^3$ is alkyl of 1 to 12 carbon atoms, said copolymer having a glass transition temperature of at least about 80° C.

8. The container of claim 7 wherein said copolymer of said sealing composition has an inherent viscosity in the range of from about 0.3 to about 0.9.

9. The container of claim 7 wherein said copolymer of said sealing composition has a peel strength in the range of from about 95 to about 240 g/cm, measured at 180° and a rate of 2.54 cm/min.

10. The container of claim 7 wherein said copolymer of said sealing composition comprises about 60 to about 90 percent, by weight, of (a) and has a glass transition temperature in the range of from about 80° to about 110° C.

11. The container of claim 7 wherein n is 1 and $R^3$ is alkyl of 1 to 5 carbon atoms.

12. The container of claim 7 in which said cavity contains a photographic processing material.

13. In a photographic film unit comprising a support and a container useful for holding fluid photographic processing material, said container comprising:

a pair of opposed walls marginally sealed together over a substantial area to provide an internal cavity adapted to retain said processing material, at least one of said walls being flexible and deformable, said opposed walls being marginally sealed together over a first part of said area, and a polymeric sealing composition interposed between said opposed walls over a second part of said area forming a seal of less strength than over said first part of said area, whereby said seal of less strength preferentially bursts along said second part of said area upon the application of pressure to said container, the improvement wherein:

said sealing composition comprises a copolymer of (a) at least about 50 percent, by weight, of a polymerizable monomer having the formula (I):

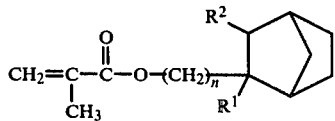

wherein n is an integer of from 0 to 3; $R^1$ is hydrogen or alkyl; and $R^2$ is hydrogen, alkyl or phenyl; with (b) a copolymerizable monomer having the formula (II):

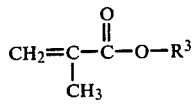

wherein $R^3$ is alkyl,
said copolymer having a glass transition temperature of at least about 80° C.

14. The film unit of claim 13 wherein said copolymer of said sealing composition has an inherent viscosity in the range of from about 0.1 to about 1.5.

15. The film unit of claim 13 wherein said copolymer of said sealing composition has a peel strength in the range of from about 50 to 250 g/cm, measured at 180° and a rate of 2.54 cm/min.

16. The film unit of claim 13 wherein said copolymer of said sealing composition comprises about 60 to about 90 percent, by weight, of (a) and has a glass transition temperature in the range of from about 80° to about 150° C.

17. The film unit of claim 13 wherein $R^1$ is hydrogen or alkyl of 1 to 4 carbon atoms; $R^2$ is hydrogen, alkyl of 1 to 6 carbon atoms or phenyl; and $R^3$ is alkyl of 1 to 14 carbon atoms.

18. In a photographic film unit comprising:
A. a support having thereon a photosensitive silver halide layer;
B. an image-receiving layer;
C. a neutralizing layer for neutralizing an alkaline processing material, and
D. a container, having an alkaline processing material therein, said container comprising:
a pair of opposed walls marginally sealed together over a substantial area to provide an internal cavity holding said processing material, at least one of said walls being flexible and deformable, the internal surfaces of said walls bounding said cavity comprising a polymer which resists deterioration by the action of said processing material, said opposed walls being marginally sealed together over a first part of said area, and a polymeric sealing composition interposed between said opposed walls over a second part of said area forming a seal of less strength than over said first part of said area, whereby said seal of less strength preferentially bursts along said second part of said area upon the application of pressure to said container, the improvement wherein:
said sealing composition comprises a copolymer of
(a) at least about 50 percent, by weight, of a polymerizable monomer having the formula (I):

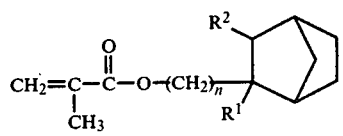

wherein n is an integer of from 0 to 3; $R^1$ is hydrogen or alkyl; and $R^2$ is hydrogen, alkyl or phenyl; with
(b) a copolymerizable monomer having the formula (II):

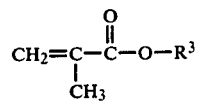

wherein $R^3$ is alkyl,
said copolymer having a glass transition temperature of at least about 80° C.

19. The film unit of claim 18 wherein said copolymer of said sealing composition has an inherent viscosity in the range of from about 0.1 to about 1.5.

20. The film unit of claim 18 wherein said copolymer of said sealing composition comprises about 60 to about 90 percent, by weight, of (a) and has a glass transition temperature in the range of from about 80° to about 110° C.

21. The film unit of claim 18 wherein each of $R^1$ and $R^2$ is hydrogen; and $R^3$ is alkyl of 1 to 12 carbon atoms.

22. The film unit of claim 21 wherein n is 1 and $R^3$ is alkyl of 1 to 5 carbon atoms.

* * * * *

UNITED STATES PATENT AND TRADEMARK OFFICE
CERTIFICATE OF CORRECTION

PATENT NO. : 4,188,219
DATED : February 12, 1980
INVENTOR(S) : John D. Cawley

It is certified that error appears in the above—identified patent and that said Letters Patent are hereby corrected as shown below:

Column 5, line 52, after "lead" delete "of" and insert --or--.

Column 7, lines 29, 45, and 62, insert a "hyphen" after "methacrylate-co".

Column 8, line 2, insert a "hyphen" after "methacrylate-co".

Column 9, line 26, delete "quotation marks" and insert --41--.

Column 11, Table II, Example 5, insert --10.+-- in "260°C." column.

Signed and Sealed this

Seventeenth Day of June 1980

[SEAL]

Attest:

Attesting Officer

SIDNEY A. DIAMOND

Commissioner of Patents and Trademarks